United States Patent Office 3,183,221
Patented May 11, 1965

3,183,221
RUBBERY POLYMER OF A HEAVY PETROLEUM HYDROCARBON, PROCESS OF MAKING SAME, AND BLENDS THEREOF WITH A RUBBERY DIENE POLYMER
William N. Axe, James T. Gragson, and Sidney Schiff, Bartlesville, Okla., assignors to Phillips Petroleum Company, a corporation of Delaware
No Drawing. Filed Dec. 30, 1960, Ser. No. 79,489
12 Claims. (Cl. 260—887)

This invention relates to a rubber extender. It also relates to an extended rubber product. It also relates to a method of making a rubber extender. It also relates to making a rubber product which has been extended.

In one of its aspects, the present invention relates to a rubbery polymer product and to a method for preparing the same which comprises heating a heavy hydrocarbon oil with an organic peroxide, and recovering a rubbery polymer product from the reaction mass thus obtained. In another of its aspects, the invention relates to a method of modifying a rubber by incorporating, during its compounding, a rubbery polymer as produced in one aspect of this invention. In a still further aspect of the invention, it relates to the rubbery polymer herein described. In a further aspect of the invention, it relates to the modified or compounded rubber, also herein described.

In a further aspect of the invention, it relates to a moldable rubbery and resinous polymer product and to a molded mass which is obtained therewith, the product being obtained by heating an oil fraction essentially containing microcrystalline wax with a peroxide, as herein described.

We have now discovered that a rubbery polymer product can be prepared by heating a heavy petroleum lubricating oil containing fraction with certain organic peroxides such as those herein set forth. We have also discovered that the product thus obtained is a useful rubber extender which not only modifies rubber to produce relatively low resilience but, quite unexpectedly, low heat build-up.

It is known that low heat build-up is very desirable especially for heavy duty tires.

It is an object of this invention to provide a new rubbery polymer product. It is another object of this invention to provide a method for the preparation of a new rubbery polymer product. It is a further object of this invention to provide a method of usefully extending a rubber. It is a still further object of this invention to provide a novel extended rubber product having unexpectedly low heat build-up.

A further object still is the provision of a rubbery, yet resinous product, which can be molded.

Other aspects, objects and the several advantages of this invention are apparent from this disclosure and the appended claims.

According to the invention, there is provided a method for producing a rubbery polymer product which comprises heating a heavy lubricating hydrocarbon oil containing fraction together with an organic peroxide.

Still according to the invention, there is produced a novel rubbery polymer product which can be molded or used as an extender for a rubber, preferably a synthetic rubber, the said product being obtained by heating together a heavy lubricating hydrocarbon oil together with an organic peroxide.

Still further, according to the invention, there is provided an extended rubber product, preferably prepared from a synthetic rubber, the rubber being extended by incorporating therewith, a rubbery polymer, produced as described herein.

Still further, according to the invention, there is produced a somewhat rubbery but also resinous product which is moldable to a rather hard material by treating, according to the invention, with an organic peroxide, a microcrystalline wax.

The peroxides which are, all of them, organic peroxides, include the hydroperoxides and the hydrocarbon peroxides, as well as those which are substituted hydrocarbon peroxides in which the substitution is not on the carbon or carbons to which the peroxide oxygens are attached. The peroxides useful in practicing the process of this invention are preferably the alkyl and aryl peroxides and hydroperoxides. The hydrocarbon group can be substituted, though the substituent group should not be attached to the carbon atom to which a peroxide oxygen is attached. The peroxides may have as many as 30 or more carbon atoms per molecule and be quite operative in the process. However, peroxides with not more than 20 carbon atoms per molecule are preferred as the reactive oxygen makes up a greater proportion of these molecules. Specific examples of peroxides which are included in the foregoing and which are useful in this invention are dimethyl, diethyl, diisopropyl, di-tert-butyl and dicumyl peroxides, as well as unsymmetrical peroxides such as tertiary-butyl cumyl peroxide, etc.

The peroxides appear to function as reagents. These are ordinarily employed in amounts ranging from about one-tenth to about three mols for each mol of hydrocarbon, preferably from about one to about one-and-a-half mols for each mol of hydrocarbon.

The petroleum hydrocarbons suitable as charge stock for this process are the refined residual petroleum hydrocarbons, which include lubricating oils and/or microcrystalline wax, having average molecular weights of at least 600 and preferably containing substantially no fraction having a molecular weight below about 450–500. The refining steps used in preparing the charge hydrocarbon usually include deasphalting and propane fractionation, and may include solvent extraction. The refining processes should not be so drastic as to remove substantially all of the naphthenic and aromatic rings. The refining can optionally include a dewaxing step, as the microcrystalline waxes recovered from these oils produce somewhat borderline products by reaction with these peroxides, the products being somewhat rubbery but also resinous in that they are moldable to rather hard materials. Too highly paraffinic materials, including the more paraffinic fractions of Kansas City 250 lubricating stock (defined in the example) separated by silica gel fractionation, react and polymerize; but they do not give the desired rubbery product.

It is not desirable to have low molecular weight diluents present, this being in accord with the minimum molecular weight of the hydrocarbons to be present as previously discussed. It has been found that dilution with cetane or methylnaphthalene will prevent the formation of the rubbery polymer.

The temperature at which this process is carried out depends on the particular peroxide used, and it is at least as high as the decomposition temperature of the peroxide used. As an example, di-tertiary-butyl peroxide begins to decompose at about 240° F. Operation is ordinarily not more than about 100 to 150° F. above the threshold decomposition temperature. The reaction is usually carried out below 450° F., and preferably below 400° F.

The reaction time is ordinarily quite short, less than a minute being required under usual operating conditions. However, longer times may be employed when desired, such as 5 minutes or even 30 minutes being operable.

The reaction mixture can be readily purified by extraction with a solvent such as acetone for the removal of the peroxide decomposition products and then with pentane, toluene or other hydrocarbon to remove oils. The solvents are then removed, for example, by vaporization, and the polymer is ready for use. The polymer is substantially insoluble in any of the common solvents.

The polymer is particularly useful as a rubber extender whereby low resilience rubbers with low heat build-up can be obtained.

EXAMPLE I

A mixture of 2.1 grams of Kansas City 250 lubricating oil and 6.0 grams of dicumyl peroxide was warmed on a hot plate and swirled to effect solution. (Kansas City 250 lubricating oil is a deasphalted, propane fractionated, solvent extracted and dewaxed product having a molecular weight of about 700 and a viscosity of 200-215 SUS at 210° F.). The mixture was then heated to about 325° F., at which time effervescence began followed by a sudden reaction accompannied by intense foaming which subsided in a few seconds. A rubbery polymer was produced. The polymer was recovered by extraction with acetone to remove the peroxide decomposition products and then with pentane to remove oil. Acetone was added to the pentane gel to precipitate the polymer; the solvents were decanted; and the residue was air-dried.

The air-dried rubbery polymer was evaluated as a rubbery extender by compounding with a GR-S type rubber and compared with a commercial rubber extender Philrich 5. The recipe used was as follows:

|  | Test | Control |
|---|---|---|
| Philprene 1500 | 100 | 100 |
| Philblack O | 50 | 50 |
| Zinc Oxide | 3 | 3 |
| Stearic Acid | 1 | 1 |
| Flexamine | 1 | 1 |
| Rubbery Polymer | 10 |  |
| Philrich 5 |  | 10 |
| Sulfur | 1.75 | 1.75 |
| Santocure | 1.2 | 1.2 |

PHYSICAL PROPERTIES

|  |  |  |
|---|---|---|
| 30 min. cure, 307° F.: |  |  |
| ΔT, F, Heat Build-up | 66.6 | 63.2 |
| Resilience, percent | 52.8 | 61.4 |
| Over-aged, 24 hrs. at 212° F.: |  |  |
| ΔT, F, Heat Build-up | 55.1 | 54.1 |
| Resilience, percent | 56.8 | 67.2 |

TRADEMARKED PRODUCTS DEFINITIONS

Philprene 1500—Butadiene-styrene copolymer prepared in an aqueous emulsion at 41° F., having a bound styrene content of approximately 23 weight percent and a Mooney value (ML-4 at 212° F.) of about 52.

Philblack O—High abrasion furnace black.

Flexamine—Physical mixture containing 65 percent of a complex diarylamine-ketone reaction product and 35 percent of N,N'-dihphenyl-p-phenylene-diamine.

Philrich 5—Highly aromatic, high boiling hydrocarbon oil with typical properties of A.P.I. gravity, 11.6; flash point, 480° F.; viscosity, SUS at 210° F., 175; carbon residue, 3.25 weight percent.

Santocure—N-cyclohexyl-2-benzothiazolesulfenamide.

These data show an unusual combination of low resilience and low heat build-up in the rubber compounded with the rubbery polymer of this invention. This compounded rubber is particularly useful in applications where damping of vibration or shock is important.

The invention is especially well suited to be practiced with synthetic rubber of the GR-S type above exemplified.

EXAMPLE II

Microcrystalline wax example

A mixture of 4.4 grams of di-cumyl peroxide and 5.5 grams of commercial microcrystalline wax (melting point, 190-195° F.) was warmed in a flask. As solution occurred, evolution of vapors began. A sudden effervescence and foaming took place and subsided in a few seconds resulting in a light yellow, foamy polymer which was not sticky.

EXAMPLE III

Paraffin wax comparative example

A mixture of 5.9 grams of San Roque paraffin wax and 6.0 grams of dicumyl peroxide was warmed in a flask. Effervescence and foaming took place when the peroxide decomposed, but no solid polymer was formed.

EXAMPLE IV

Polymerization of lubircating oil fractions

A portion of the heavy lubricating oil of Example I was separated with silica gel to produce the fractions shown in the table below:

| Frac. No. | Eluant | Chg. | Carbon Distribution, Percent | | | | Avg. Ring/Molecule | | |
|---|---|---|---|---|---|---|---|---|---|
| | | | Total in Rings | Aromatic Rings | Naphthene Rings | Paraffin | Total | Aromatic | Naphthene |
| 1 | Pentane | 19.4 | 28.5 | 0 | 28.5 | 71.5 | 3.0 | 0 | 3.0 |
| 2 | Pentane | 20.2 | 29.0 | 2.0 | 27.0 | 71.0 | 3.3 | 0.2 | 3.1 |
| 3 | Benzene | 14.2 | 42.0 | 20.5 | 20.5 | 58.0 | 5.0 | 2.0 | 3.0 |

The ring analysis is described by Van Ness and Van Weston, "Aspects of the Constitution of Mineral Oils," Elsevier Publishing Company, New York.

Each of the fractions was heated with dicumyl peroxide. Fratcions 1 and 2 did not produce a solid polymer, while fraction 3 did produce a solid polymer.

EXAMPLE V

Molding resin made from microcrystalline wax

A small portion of the resin made from microcystalline wax as described in a previous example was molded in a press at 310° F. and about 10-15 tons pressure, for 5 minutes to form a disc 2½ inches in diameter and ⅟₁₆ inch thick. These data show that the resin is readily molded.

While the rubbery polymer has been described as incorporated into the rubber stock by compounding, it is within the scope of the invention to incorporate the polymer into a rubber in latex stage. This can be accomplished by making a slurry of the polymer in acetone or pentane and mixing this slurry uniformly through the latex before precipitation and recovery of the rubber. This makes a very uniform mixture of the polymer and rubber. Acetone is now preferred from the standpoint of removal from the rubber, as this compound would be removed along with the water from the latex. A slurry of the rubbery polymer in pentane, using a Waring Blendor, has been made.

It is somewhat surprising to find that the hydrocarbons used according to the invention will react with organic peroxides to give rubbery products. Clearly, these hydrocarbons are essentially free of olefinic unsaturation.

It appears that a highly paraffinic oil will not polymerize sufficiently to produce the presently-desired rubbery polymers. Thus, although such materials appear to polymerize, they do not do so to the extent of producing desirable rubbery polymers.

The polymers which are made according to the present invention can be made merely by heating the oil and the peroxide on a hot plate to a temperature at which the peroxide begins to decompose. The polymer is formed almost instantaneously or in a short time.

Reasonable variation and modification are possible within the scope of the foregoing disclosure and the appended claims to the invention, the essence of which is that there have been provided a method for the production of a novel rubbery polymer from a heavy petroleum, such as a lubricating oil containing fraction and/or a microcrystalline wax containing fraction as herein defined by the treatment thereof at an elevated temperature with an organic peroxide, as described herein, that such a novel rubbery polymer product, which can be molded, has been provided, that a method for extending a rubber with such a product which is rubbery in character has been provided, and that there has been provided also an extended rubber product.

We claim:

1. A method for producing a rubbery polymer product which comprises heating at a reacting temperature a heavy petroleum hydrocarbon essentially free of olefinic unsaturation and containing naphthenic and aromatic constituents and having an average molecular weight of at least about 600 and not containing any substantial amount of fractions having an average molecular weight below about 400, with an organic peroxide selected to cause a reaction between said hydrocarbon and peroxide to form a rubbery polymer, said peroxide being used in a ratio of about one-tenth mol to about three mols for each mol of hydrocarbon treated, and then recovering said polymer from the reaction mixture.

2. A method according to claim 1 wherein the peroxide is selected from the group consisting of hydroperoxides and hydrocarbon peroxides.

3. A method according to claim 1 wherein the organic peroxide does not contain in excess of about 30 carbon atoms.

4. A method according to claim 1 wherein the polymer is obtained from the reaction mixture by extraction therefrom of oil and peroxide decomposition residues.

5. An extended conjugated diene rubber containing the rubbery polymer produced according to claim 1.

6. A product according to claim 5 wherein the organic peroxide is selected from the group consisting of hydroperoxides and hydrocarbon peroxides.

7. A product according to claim 5 wherein the organic peroxide does not contain in excess of about 30 carbon atoms.

8. A product according to claim 5 wherein the temperature is not substantially in excess of 100–150° F. above the threshold decomposition temperature of the organic peroxide used and is not substantially in excess of about 400° F., the polymer is obtained from the reaction mixture in which it is formed by extraction therefrom of oil and peroxide decomposition residues.

9. A product according to claim 5 wherein the rubbery polymer is present in a quantity which is of the order of 10 percent of the entire extended rubber product and wherein the rubber extended is a hydrocarbon rubber.

10. A moldable, polymer obtained by heating at a reaction temperature microcrystalline wax together with an organic peroxide selected to cause polymerization to form said polymer, said peroxide being used in a ratio of about one-tenth mol to about three mols for each mol of hydrocarbon.

11. A product obtained by subjecting a heavy petroleum hydrocarbon to a refining including deasphalting, propane fractionation, solvent extraction and dewaxing, the thus treated heavy lubricating oil fraction having an average molecular weight of at least about 600 and not ocntaining any appreciable amount of any fraction having an average molecular weight below about 400, said fraction being essentially free from olefinic unsaturation and containing naphthenic and aromatic constituents; subjecting the thus obtained fraction to heating at a reacting temperature with one-tenth to three mols, based upon the hydrocarbon treated, of an organic peroxide used in a ratio of about 1 to about 1½ mols for each mol of hydrocarbon treated and selected to yield a reaction mass containing a recoverable rubbery polymer, then extracting said mass with the solvent to remove therefrom the residues of the reaction and any unconverted oil, and then drying the product thus obtained which remains undissolved in the solvent.

12. A method for producing a rubbery polymer product which comprises heating at a reacting temperature a heavy petroleum hydrocarbon essentially free of olefinic unsaturation and containing naphthenic and aromatic constituents and having an average molecular weight of at least about 600 and not containing any substantial amount of fractions having an average molecular weight below about 400, with an organic peroxide selected to cause a reaction between said hydrocarbon and peroxide to form a rubbery polymer, said peroxide being used in a ratio of about 1 to about 1½ mols for each mol of hydrocarbon treated.

References Cited by the Examiner
UNITED STATES PATENTS

| | | | |
|---|---|---|---|
| 2,468,414 | 4/49 | Soday | 260—887 |
| 2,519,796 | 8/50 | Sperberg et al. | 260—894 |
| 2,567,016 | 9/51 | Gessler et al. | 260—887 |
| 2,591,890 | 4/52 | Thompson et al. | 260—2 |
| 2,862,914 | 12/58 | Leary et al. | 260—82 |
| 2,987,536 | 6/61 | Skees et al. | 208—3 |
| 2,994,689 | 8/61 | Banes et al. | 260—82 |

WILLIAM H. SHORT, *Primary Examiner.*

D. ARNOLD, LEON J. BERCOVITZ, *Examiners.*